July 25, 1939.  J. SAYEN  2,167,262
COMBINATION DRAG AND HARROW
Filed Nov. 17, 1938  2 Sheets-Sheet 1

INVENTOR:
John Sayen.
By Grover L. Hill,
ATTORNEY.

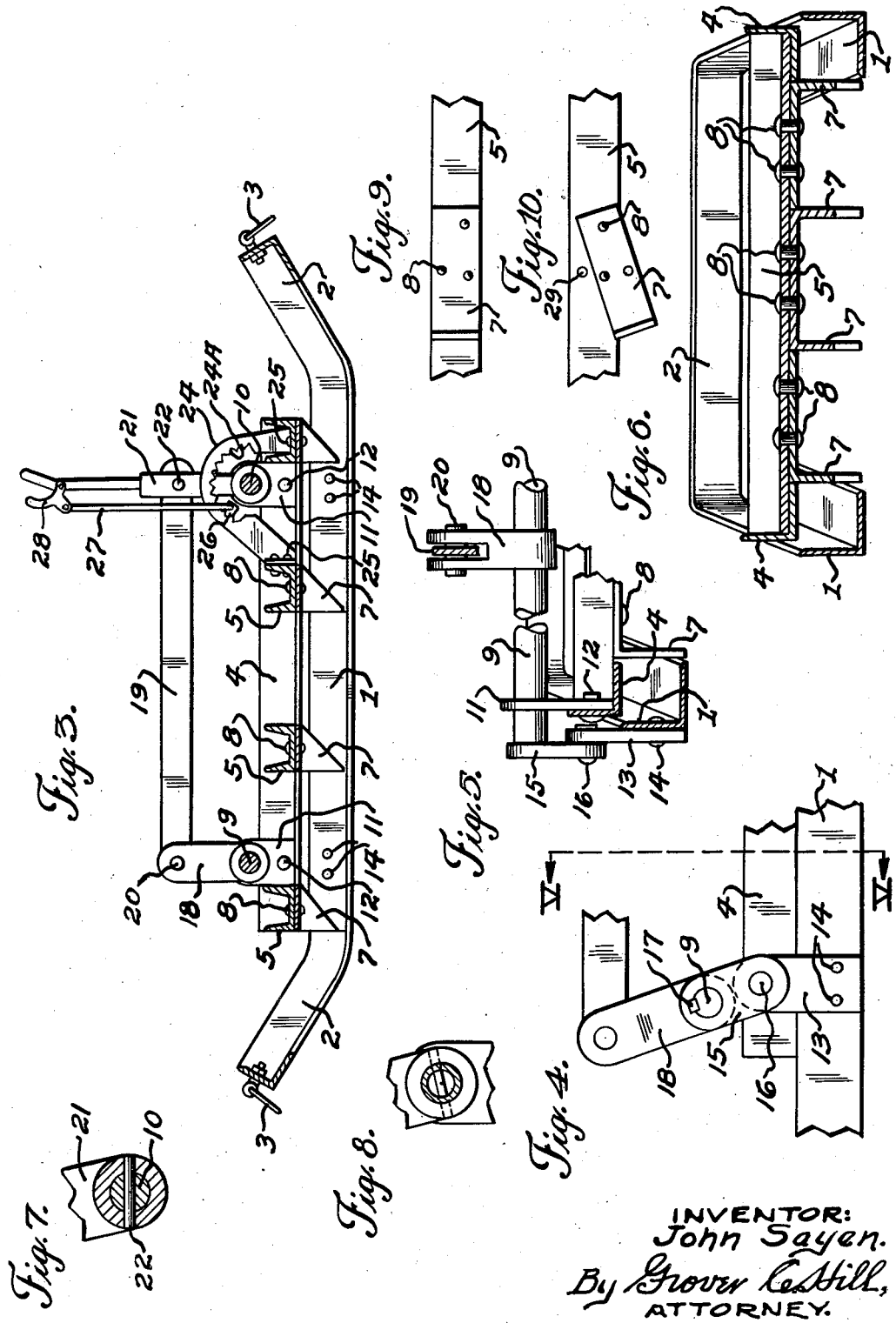

Patented July 25, 1939

2,167,262

UNITED STATES PATENT OFFICE 2,167,262

COMBINATION DRAG AND HARROW

John Sayen, Detroit, Mich.

Application November 17, 1938, Serial No. 240,913

1 Claim. (Cl. 55—23)

This invention relates to improvements in that branch of agriculture in which plowed ground possesses frequent chunks of dirt and it becomes necessary to break up the chunks; this is usually accomplished with the disc harrow which leaves the dirt with an uneven surface, and before planting can be effected the dirt must of necessity be properly leveled. For leveling the dirt the old-fashioned drag is usually resorted to, and while somewhat effective for this purpose it fails to place the dirt in a satisfactory condition for planting.

The principal object of the invention is to provide a combination implement wherein a suitable drag and harrow are arranged, and being constructed so that either the drag or harrow may be successfully used without interfering with the other, and in this manner wherein one implement serves for both purposes it obviates the necessity of two separate implements for both operations.

With the foregoing in mind, it will become readily apparent that the invention possesses further advantages, all of which will be clearly revealed during the course of the following detailed description, illustrated throughout the accompanying drawings, and more fully pointed out in the appended claim.

With reference to the drawings:

Figure 3 is also a longitudinal section taken upon line II—II of Figure 1, but showing the harrow in an elevated position and the drag in normal operation.

Figure 4 is an enlarged elevational view of a portion of the major mechanism of the device.

Figure 5 is an enlarged sectional view taken at the position of line V—V of Figure 4.

Figure 6 is a transverse section taken upon line VI—VI of Figure 1.

Figure 7 is a superenlarged sectional view showing how the principal lever is keyed to one of the shafts of the device.

Figure 8 is a modified form showing the shafts substituted with tubular construction.

Figure 9 is a bottom view of a portion of one of the channel cross members showing the spiked members normally secured thereto.

Figure 10 is a similar view to Figure 9, and showing how the spike members may be placed on an angle with respect to the cross member.

Figure 2:
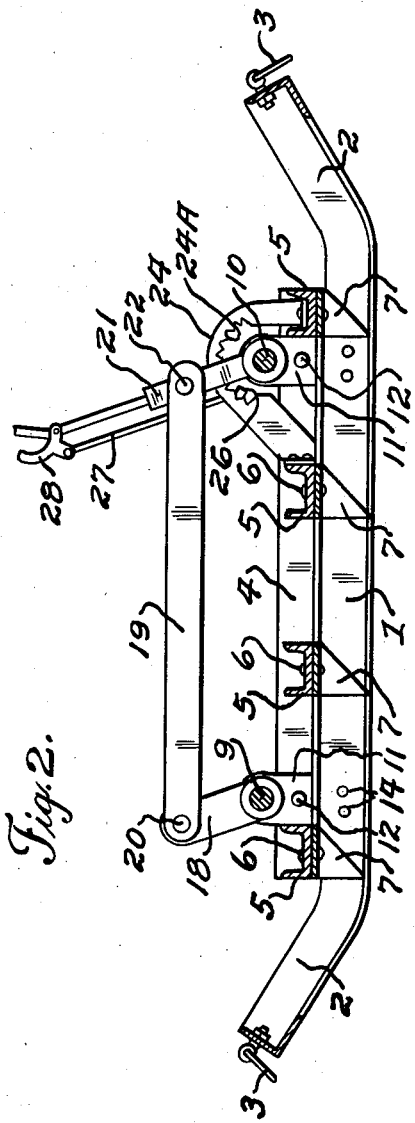
Figure 2 is a longitudinal section taken directly upon line II—II of Figure 1, and showing the harrow in operation.

The drag unit of the device consists of a durable frame which is composed of a suitable angle iron material, and has side rails 1 arranged in parallel order, and it follows that the ends of said sides terminate to narrowed ends or cross members 2, and referring to Figures 2 and 3 it is also understood that portions 2 are deflected upwardly with respect to sides 1.

Swivels 3 are provided and are secured to portions 2 where indicated, and are adapted to accommodate any suitable hitch from a team of horses or from a tractor.

Figure 1:
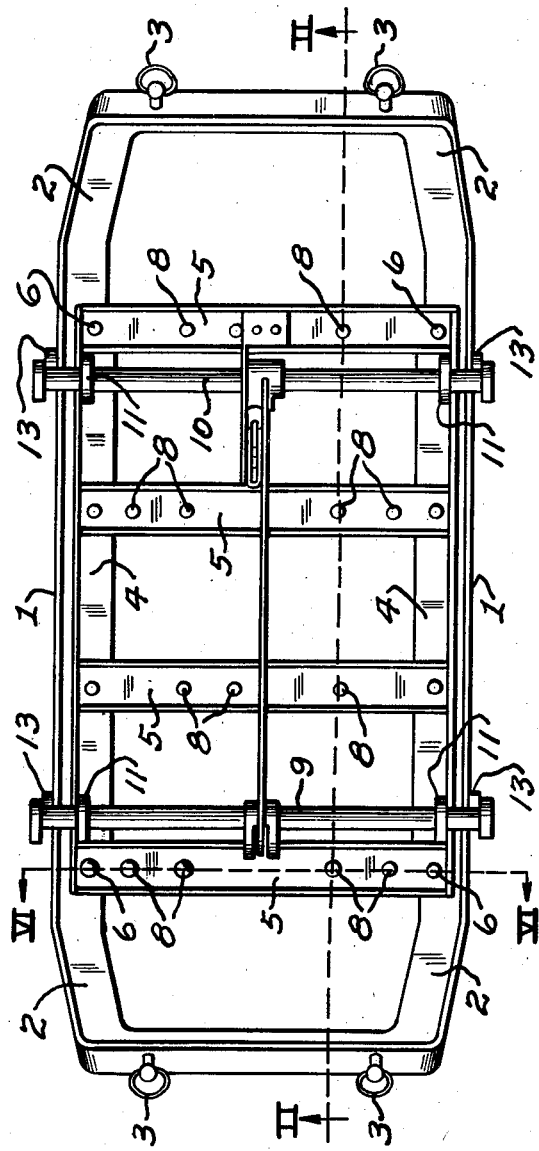
Figure 1 is a top plan view of the complete invention.

The harrow unit of the implement comprises sides 4 arranged in parallel order and preferably composed of a durable angle iron material, and with particular reference to Figure 1 it follows that sides 4 are rigidly connected by means of cross members 5 arranged in spaced apart relation with the aid of rivets 6 where shown, and said cross members are preferably composed of channel steel as indicated.

Secured to the under surface of cross members 5 are angular spiked members 7 with the aid of rivets or bolts 8 and are arranged in spaced apart relation, and it is also observed that for obvious reasons the groups of said spike members upon the respective cross members 5 are arranged in spaced apart relation, with respect to each other. It is also observed that for obvious reasons the groups of spiked members 7 upon the respective cross members 5 are staggered with respect to each other.

Apertures 29 within cross members 5 are arranged so that spiked members 7 may be changed from the position shown in Figure 9 to the position shown in Figure 10 when it is necessary.

The harrow unit of the device is shiftable with respect to the drag unit in the following manner:—

Transversely extending shafts 9 and 10 are provided and are supported and journaled within upstanding members 11, and said members are rigidly secured to rails 4 of the harrow unit by means of rivets or screws 12 as indicated.

Referring more particularly to Figure 5 it is clear that upright members 13 are provided and are rigidly secured to rails 1 where shown with the aid of rivets or screws 14, and pivoted to the top of said members are links 15 respectively with the aid of rivets or screws 16, and in Figure 4 it is clear that the top portion of links 15 are keyed to the respective shafts 9 and 10 as at 17.

Still referring to Figures 4 and 5 it follows that lever 18 is keyed to the central portion of shaft 9 and that horizontally disposed bar 19 is pivotally secured to lever 18 as at 20, and the opposite end of said bar is likewise secured to operating lever 21 as at 22. In Figure 7 it is seen that operating lever 21 is keyed to shaft 10 as at 23.

With reference to Figures 2 and 3 it follows that segmental member 24 is secured to cross members 5 as at 25 and is provided with serrated portion 24A as shown, and so as to engage pawl 26 coacting with vertically disposed rod 27 and gripping lever 28 with any approved method of spring action for these elements being employed.

Taken from the foregoing explanation it is now readily understood that the harrow unit of the implement is shiftable with respect to the drag unit thereof, and that this operation is effected by manually operated lever 21 thereby rendering the drag unit operative as indicated in Figure 3, or likewise rendering the harrow unit operative as indicated in Figure 2, and by virtue of segmental member 24 coacting with lever 21 the drag unit and the harrow unit may be held in any predetermined adjustment in relation to each other consistent with the particular work required to be accomplished.

In conclusion, let it be understood that the complete disclosure herewith is merely illustrative of the general principle sought to be protected by Letters Patent, and that any modification made during any probable further development for the market, would fall consistently within the scope of the claim.

Having thus fully described my invention, what I claim as new is:

In an implement of the character described, a drag unit having parallel side rails and end bars connecting the side rails, a harrow unit having parallel side rails and cross members secured to said rails, draw cut teeth carried by the cross members, upright members rigidly secured to the first mentioned side rails, upstanding members secured to the last mentioned side rails, a forward transversely extending shaft and a rear transversely extending shaft, said shafts being journaled within the second mentioned upstanding members, links keyed to the ends of the respective shafts and pivoted to said upright members, an upwardly extending lever arm keyed to said rear shaft, an operating lever keyed to said forward shaft, a segmental member secured to certain of said cross members in straddling relation to the front shaft and having an inner serrated portion, a pawl carried by said operating lever for engaging said serrated portion, a vertically disposed rod connecting with said pawl, and a gripping lever secured to said pawl and to the operating lever.

JOHN SAYEN.